(12) United States Patent
Martino et al.

(10) Patent No.: US 11,628,782 B2
(45) Date of Patent: Apr. 18, 2023

(54) SASH COVER ASSEMBLY FOR A VEHICLE

(71) Applicant: Nissan North America, Inc., Franklin, TN (US)

(72) Inventors: Marlo Martino, Rochester Hills, MI (US); James Haupt, Livonia, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 111 days.

(21) Appl. No.: 17/365,681

(22) Filed: Jul. 1, 2021

(65) Prior Publication Data
US 2023/0001863 A1    Jan. 5, 2023

(51) Int. Cl.
*B60R 13/02* (2006.01)
*B60J 10/76* (2016.01)

(52) U.S. Cl.
CPC ........... *B60R 13/0206* (2013.01); *B60J 10/76* (2016.02)

(58) Field of Classification Search
CPC .............................. B60R 13/0206; B60J 10/76
See application file for complete search history.

(56) References Cited

U.S. PATENT DOCUMENTS

| | | | |
|---|---|---|---|
| 7,364,382 B2 | 4/2008 | Benedetti et al. | |
| 8,528,295 B2 | 9/2013 | Glynn et al. | |
| 9,657,807 B2 | 5/2017 | Morris et al. | |
| 10,968,931 B1 | 4/2021 | Forti et al. | |
| 2003/0102693 A1 | 6/2003 | Lyndan et al. | |
| 2022/0299062 A1* | 9/2022 | Kempf | ................. F16B 5/0685 |

FOREIGN PATENT DOCUMENTS

| | | | | |
|---|---|---|---|---|
| DE | 102007014984 B4 * | 3/2019 | ......... | B60R 13/0838 |
| EP | 1475273 A1 | 11/2004 | | |
| EP | 1292486 B1 | 6/2005 | | |
| JP | 4434893 B2 | 3/2010 | | |
| WO | 01/98133 A2 | 12/2001 | | |
| WO | 2018060964 A1 | 4/2018 | | |

OTHER PUBLICATIONS

PE2E Search computer translation of DE102007014984-B4.*

* cited by examiner

*Primary Examiner* — D Glenn Dayoan
*Assistant Examiner* — Melissa Ann Bonifazi
(74) *Attorney, Agent, or Firm* — Global IP Counselors, LLP

(57) ABSTRACT

A sash cover assembly for a vehicle includes a sash cover and a spacer cap. The sash cover includes a projection configured to be received by a sash of the vehicle. The spacer cap is connected to and surrounds the projection. The spacer cap is configured to prevent contact between the projection and the sash when the sash cover is connected to the sash.

20 Claims, 5 Drawing Sheets

SASH COVER ASSEMBLY FOR A VEHICLE

BACKGROUND

Field of the Invention

The present invention generally relates to a sash cover assembly for a vehicle. More specifically, the present invention relates to a sash cover assembly in which a spacer cap is connected to and surrounds a projection of a sash cover.

Background Information

A vehicular door sash movably supports a window of a door of a vehicle. A sash cover is connected to the door sash to provide an aesthetically pleasing appearance. Movement of the sash cover relative to the door sash generates a noise, which is undesired by vehicle occupants.

SUMMARY

One object of the present invention is to provide a sash cover assembly for a vehicle that eliminates the generation of a noise resulting from movement of a sash cover relative to a sash of the vehicle.

In view of the state of the known technology, one aspect of the present invention is to provide a sash cover assembly for a vehicle. The sash cover assembly includes a sash cover and a spacer cap. The sash cover includes a projection configured to be received by a sash of the vehicle. The spacer cap is connected to and surrounds the projection. The spacer cap is configured to prevent contact between the projection and the sash when the sash cover is connected to the sash.

Another aspect of the present invention is to provide a sash assembly for a vehicle. The sash assembly includes a sash and a sash cover assembly connected to the sash. The sash includes an opening disposed in the sash. The sash cover assembly includes a sash cover and a spacer cap. The sash cover is connected to the sash. A projection is connected to the sash cover. The projection is received by the opening in the sash. The spacer cap is connected to and surrounds the projection. The cap is received by the opening in the sash. The spacer cap is disposed between the sash opening and the projection to prevent contact between the sash and the projection.

Also other objects, features, aspects and advantages of the disclosed sash cover assembly for a vehicle will become apparent to those skilled in the art from the following detailed description, which, taken in conjunction with the annexed drawings, discloses exemplary embodiments of the sash cover assembly for a vehicle.

BRIEF DESCRIPTION OF THE DRAWINGS

Referring now to the attached drawings which form a part of this original disclosure.

DETAILED DESCRIPTION OF EXEMPLARY EMBODIMENTS

Selected embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Figure 1:
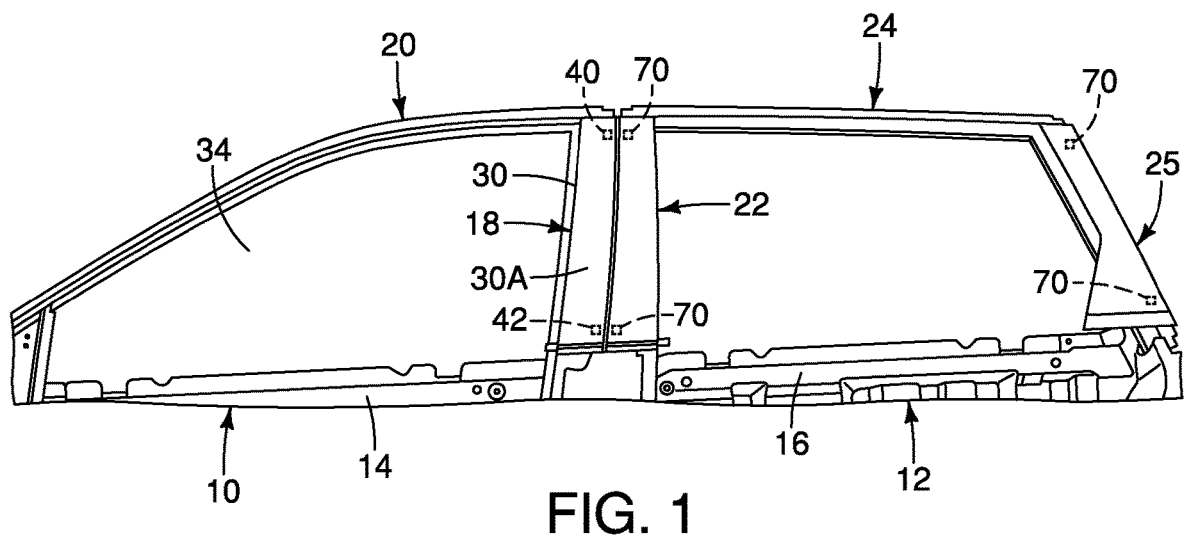
FIG. 1 is a side elevational view of a vehicle door assembly in which a sash cover assembly is connected to a sash in accordance with an exemplary embodiment of the present invention.

Referring initially to FIG. 1, a vehicle front door assembly 10 and a vehicle rear door assembly 12 is illustrated in accordance with an exemplary embodiment of the present invention. The illustrated front and rear door assemblies 10 and 12 are disposed on a driver side of the vehicle. The passenger side front and rear door assemblies are similarly configured.

The front door assembly 10 includes a front door panel 14. The rear door assembly 12 includes a rear door panel 16. A first sash cover assembly 18 is connected to a first door sash 20 of the front door panel 14. A second sash cover assembly 22 is connected to a second door sash 24 of the rear door panel 16. A third sash cover assembly 25 is connected to the second door sash 24 of the rear door panel 16. The third sash cover assembly 25 is disposed in in a vehicle rearward direction of the second sash cover assembly 22. The first and second sash cover assemblies 18 and 22 are disposed outboard of a B-pillar of a vehicle body structure. The third sash cover assembly 25 is disposed outboard of a C-pillar of the vehicle body structure.

Figure 2:
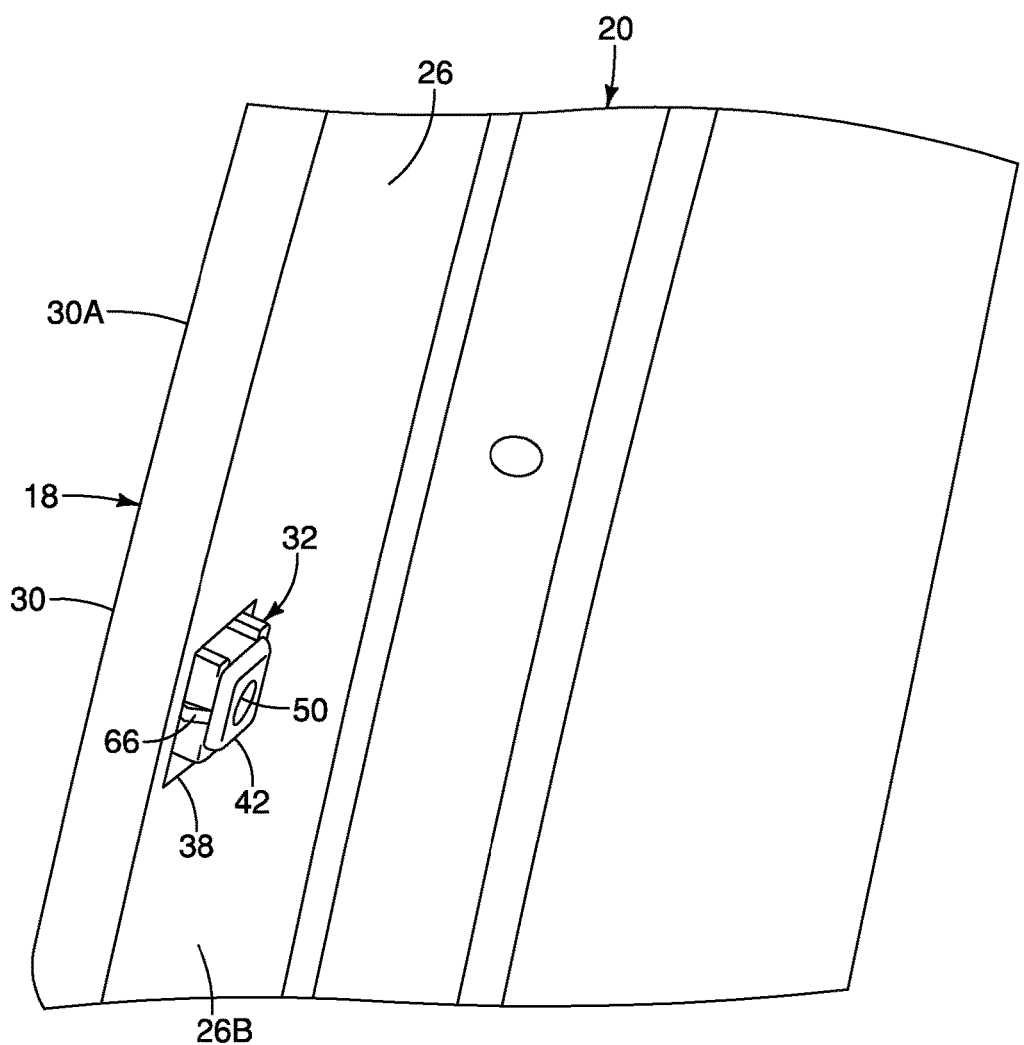
FIG. 2 is an outboard perspective view of a sash cover assembly connected to the sash of FIG. 1.
Figure 3:
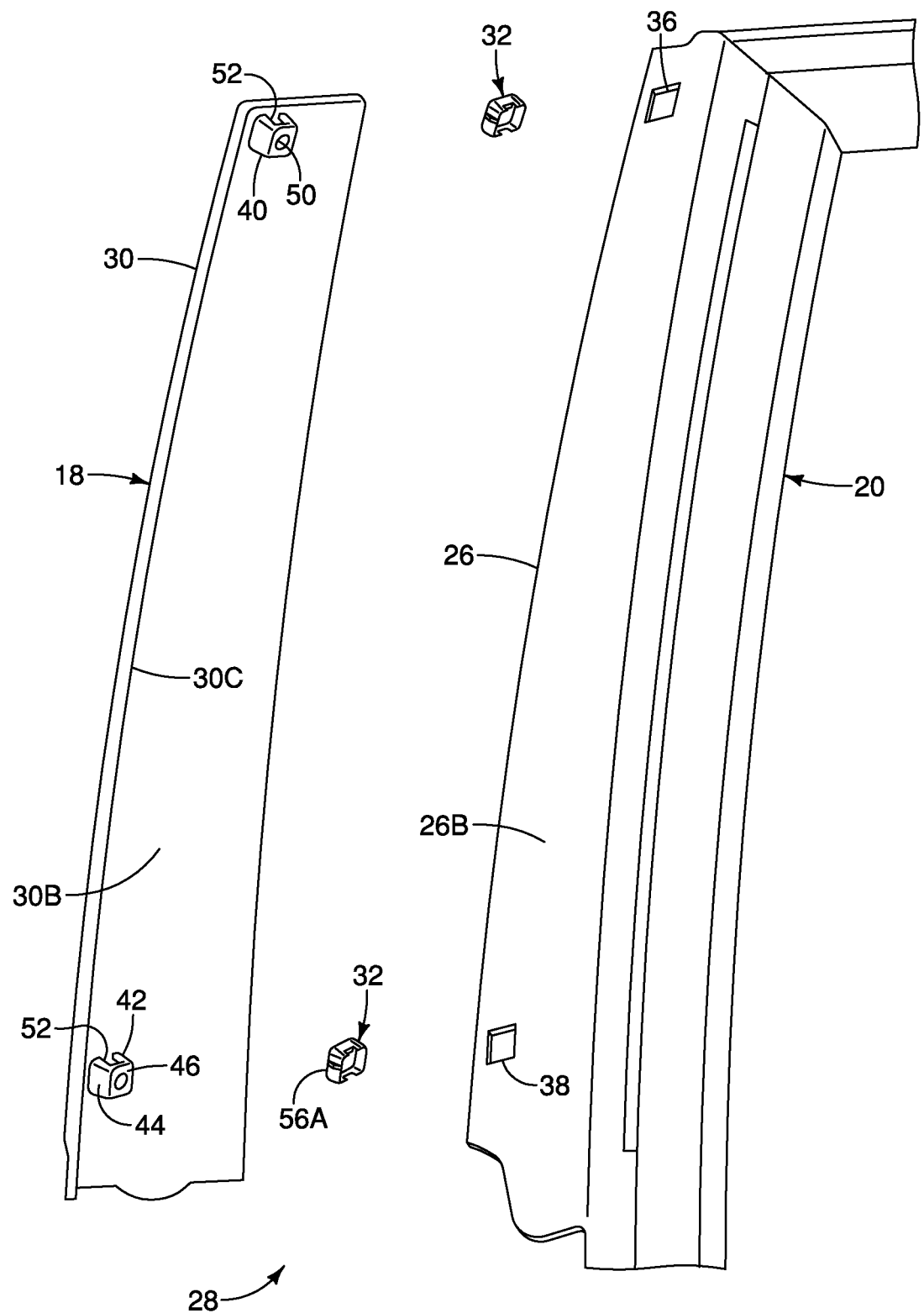
FIG. 3 is an exploded perspective view of a sash cover assembly of FIG. 1.

The first door sash 20 is connected to the front door panel 14 in a conventional manner. The first door sash 20 is configured to movingly receive a window of the front door assembly 10. The first door sash 20 includes a sash panel 26, as shown in FIGS. 2 and 3. The second door sash 24 is connected to the rear door panel 16 in a conventional manner. The second door sash 24 is configured to movingly receive a window of the rear door assembly 12. The second door sash 24 includes a front sash panel and a rear sash panel (not shown). The front sash panel of the second door sash 24 is disposed adjacent the sash panel 26 of the first door sash 20 in a rearward direction of the vehicle. The rear sash panel of the second door sash 24 is disposed rearward of the front sash panel of the second door sash. The front sash panel of the second door sash 24 is disposed inboard of the second sash cover assembly 22. The rear sash panel of the second door sash 24 is disposed inboard of the third sash cover assembly 25. The second and third sash cover assemblies 22 and 25 are connected to the respective front and rear sash panels of the second door sash 24 similarly to the first sash cover assembly 18, such that only the first sash cover assembly is described herein for the sake of brevity.

A sash assembly 28 in accordance with exemplary embodiments of the present invention includes the first door sash 20 and the sash cover assembly 18, as shown in FIG. 3. The sash cover assembly 18 includes a sash cover, or trim panel, 30 and a spacer cap 32.

The sash panel 26 extends in a direction away from a window opening 34 defined by the first door sash 20 and the front door panel 14, as shown in FIGS. 1-3. The sash panel 26 is disposed on an outboard side of the window received by the front door panel 14 and the first door sash 20. The sash panel 26 is substantially planar. A first opening 36 and a second opening 38 are disposed in the sash panel 26. The first and second openings 36 and 38 extend completely through the sash panel 26. In other words, the first and second openings 36 and 38 extend from an outboard surface 26A to an inboard surface 26B of the sash panel, as shown in FIGS. 2, 3, 7 and 8. The first opening 36 is disposed at an upper end of the sash panel 26, and the second opening 38 is disposed at a lower end of the sash panel 26. The sash panel 26 is integrally formed with the first door sash 20 as a one-piece, unitary member. The sash panel 26 is preferably made of a metallic material and is covered with a protective clear coat layer.

The sash cover 30, as shown in FIGS. 1-3, includes an outboard surface 30A and an inboard surface 30B. The outboard surface 30A of the sash cover 30 is visible when the sash cover 30 is connected to the sash panel 26, as shown in FIG. 1. A first projection, or doghouse, 40 extends outwardly from the inboard surface 30B of the sash cover 30, as shown in FIGS. 2 and 3. A second projection, or doghouse, 42 extends outwardly from the inboard surface 30B of the sash cover 30. The first projection 40 is disposed at an upper end of the sash cover 30, and the second projection is disposed at a lower end of the sash cover 30. A flange 30C extends outwardly along a length of the inboard surface 30B of the sash cover 30. The sash cover 30 is preferably made of a plastic material, such as polymethyl methacrylate (PMMA). The sash cover 30 is preferably integrally formed as a one-piece, unitary member.

Figure 7:
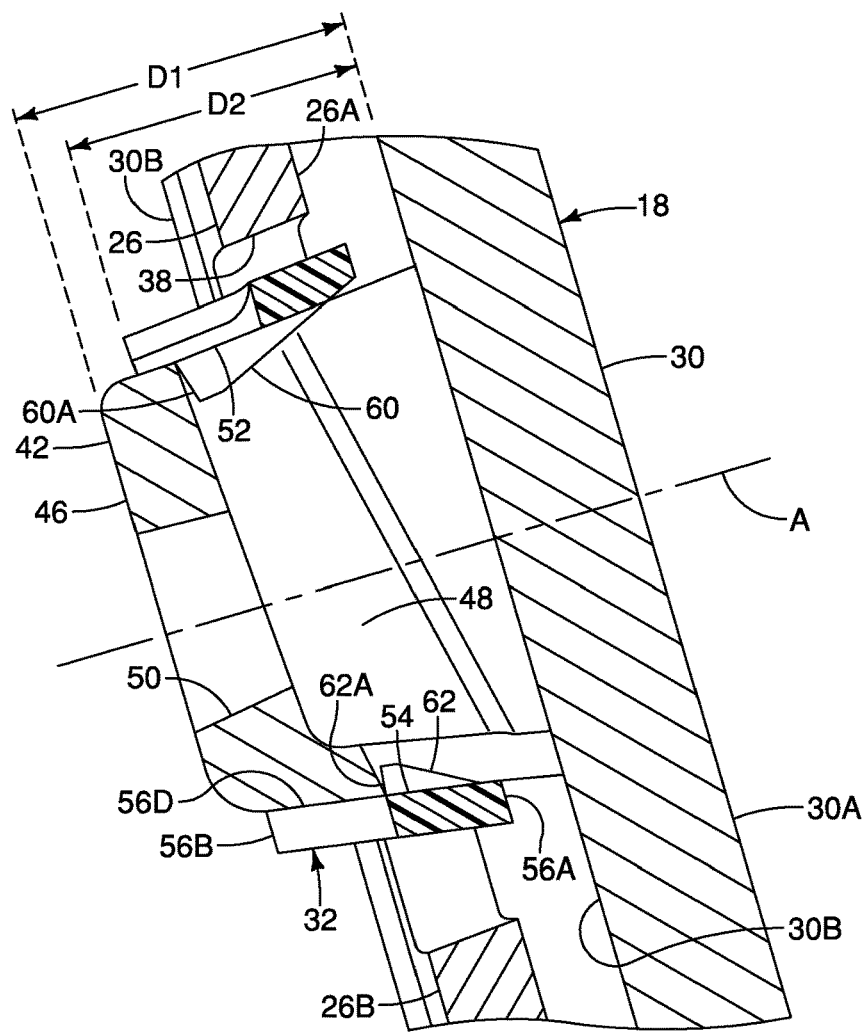
FIG. 7 is a side elevational view in cross section taken along line 7-7 of the sash cover assembly connected to the sash of FIG. 6.
Figure 8:
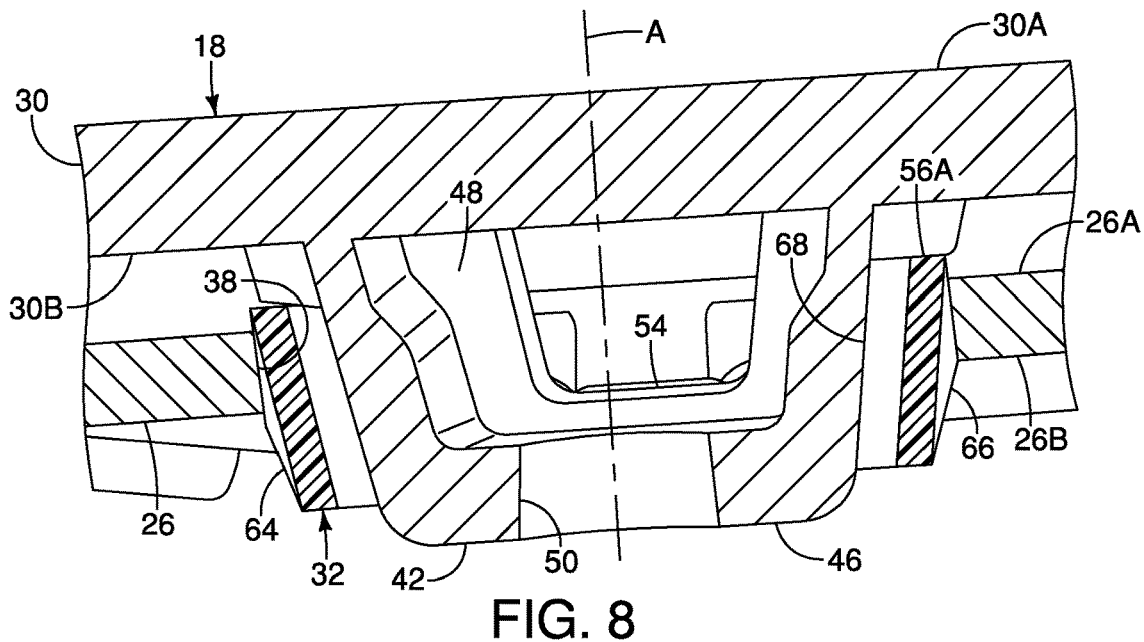
FIG. 8 is a top plan view in cross section taken along line 8-8 of the sash cover assembly connected to the sash of FIG. 6.

The first and second projections 40 and 42 are substantially identical, such that only one projection is described for the sake of brevity. As shown in FIG. 3, the projection 42 includes a side wall 44 extending outwardly from the inboard surface 30B of the sash cover 30. An upper wall 46 extends inwardly from an end of the side wall 44 to define a cavity 48 in the projection 42, as shown in FIGS. 7 and 8. An opening 50 is formed in the upper wall 46 to access the cavity 48. First and second openings 52 and 54 are disposed in the side wall 44, as shown in FIGS. 3, 7 and 8. The first and second openings 52 and 54 are oppositely disposed, as shown in FIG. 7. The first and second openings 52 and 54 extend completely through the side wall 44.

A spacer cap 32 is connected to each of the projections 40 and 42 of the sash cover 30, as shown in FIG. 3. Each of the spacer caps 32 is substantially identical. The spacer cap 32 is preferably made of a rubber material, such as an ABS (acrylonitrile butadiene styrene) rubber. Preferably, the spacer cap 32 is integrally formed as a one-piece, unitary member.

Figure 4:
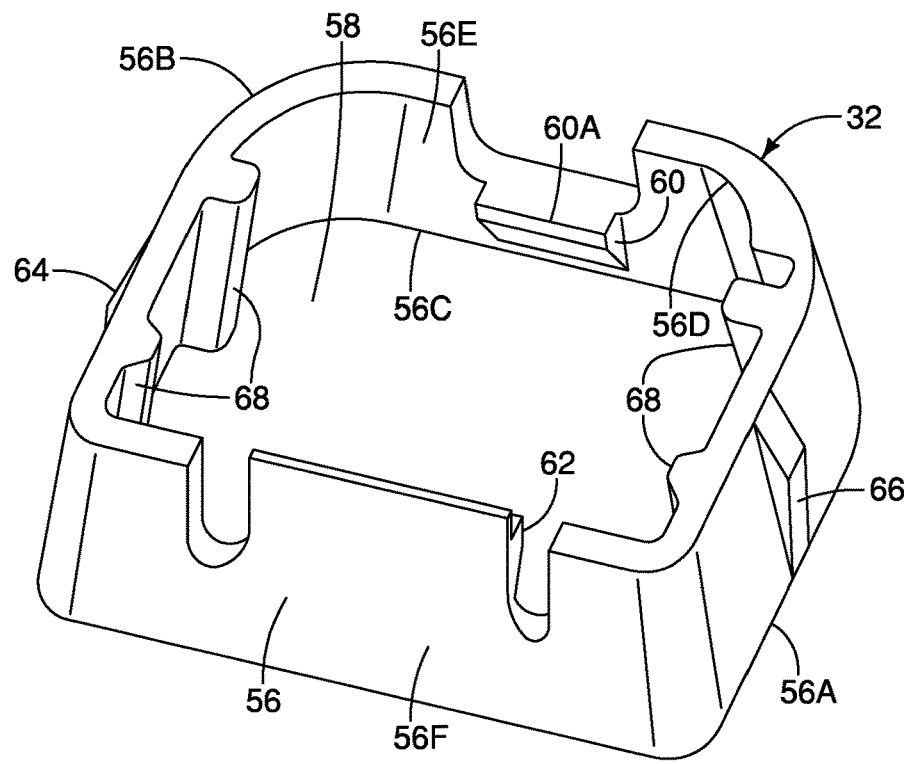
FIG. 4 is a perspective view of a spacer cap of the sash cover assembly of FIG. 1.
Figure 5:
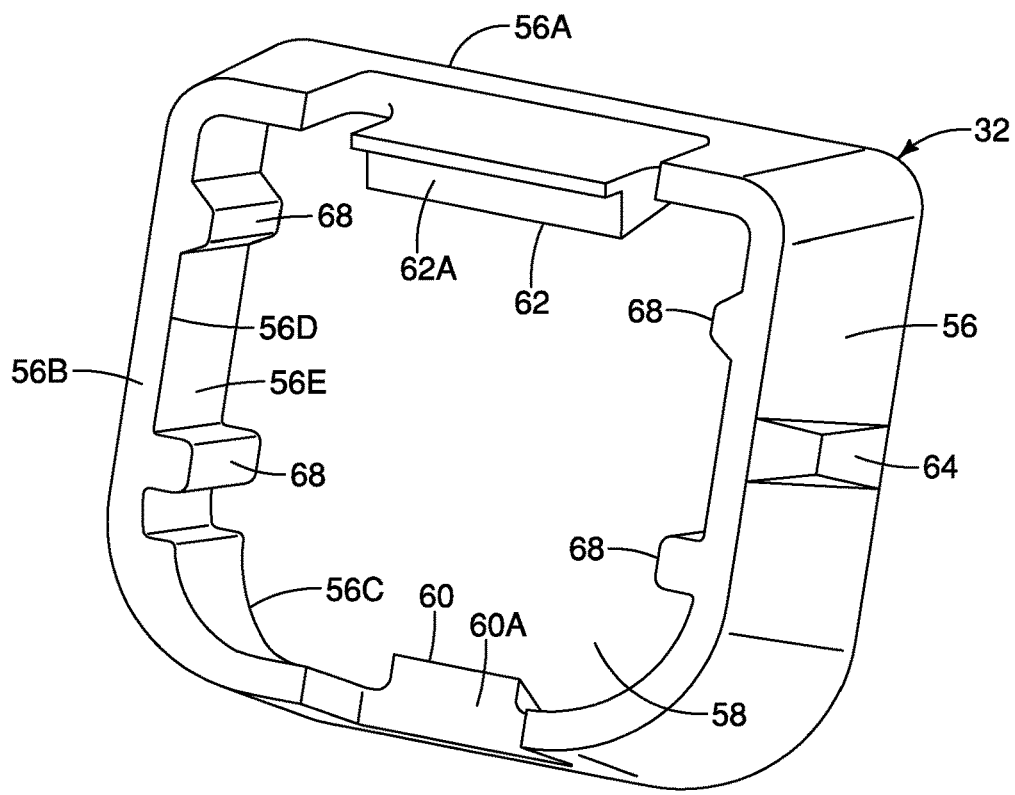
FIG. 5 is a rear perspective view of the spacer cap of FIG. 4.

The spacer cap 32 includes a wall 56, as shown in FIGS. 4 and 5. The wall 56 extends from a first, or lower, end 56A to a second, or upper, end 56B. A first, or lower, opening 56C is defined by the lower end 56A of the wall 56. A second, or upper, opening 56D is defined by the upper end 56B of the wall 56. The wall 56 defines a cavity 58 that extends from the first opening 56C at the first end 56A to the second opening 56D at the second end 56B.

A first flexible arm 60 extends inwardly from an inner surface 56E of the wall 56, as shown in FIGS. 4 and 5. The first flexible arm 60 extends inwardly from the inner surface 56E to form a first engaging surface 60A. A second flexible arm 62 extends inwardly from an inner surface of the wall 56. The second flexible arm 62 extends inwardly from the inner surface 56E to form a second engaging surface 62A. The first and second flexible arms 60 and 62 are preferably oppositely disposed. The first and second flexible arms 60 and 62 are configured to engage the projection 42 of the sash cover 30, as shown in FIG. 7.

A first ramped surface 64 extends outwardly from an outer surface 56F of the wall 56, as shown in FIGS. 4 and 5. A second ramped surface 66 extends outwardly from the outer surface 56f of the wall. The first and second ramped surfaces 64 and 66 are preferably oppositely disposed. The first and second ramped surfaces 64 and 66 extend from the first end 56A to the second end 56B of the wall 56. The first and second ramped surfaces 64 and 66 of the spacer cap 32 are configured to engage the sash panel 26 of the sash 20, as shown in FIGS. 6 and 8.

A plurality of ribs 68 extend inwardly from the inner surface 56E of the wall, as shown in FIGS. 4 and 5. The ribs 68 extend along the inner surface 56E from the first end 56A to the second end 56B of the wall 56. The spacer cap 32 is illustrated having four ribs 68, although the spacer cap can have any suitable number of ribs 68. The ribs 68 are preferably oppositely disposed. As shown in FIG. 6, two pairs of ribs 68 are oppositely disposed. Each of the ribs 68 of each pair of ribs is disposed on an opposite side of each of the ramped surfaces 64 and 66.

Figure 6:
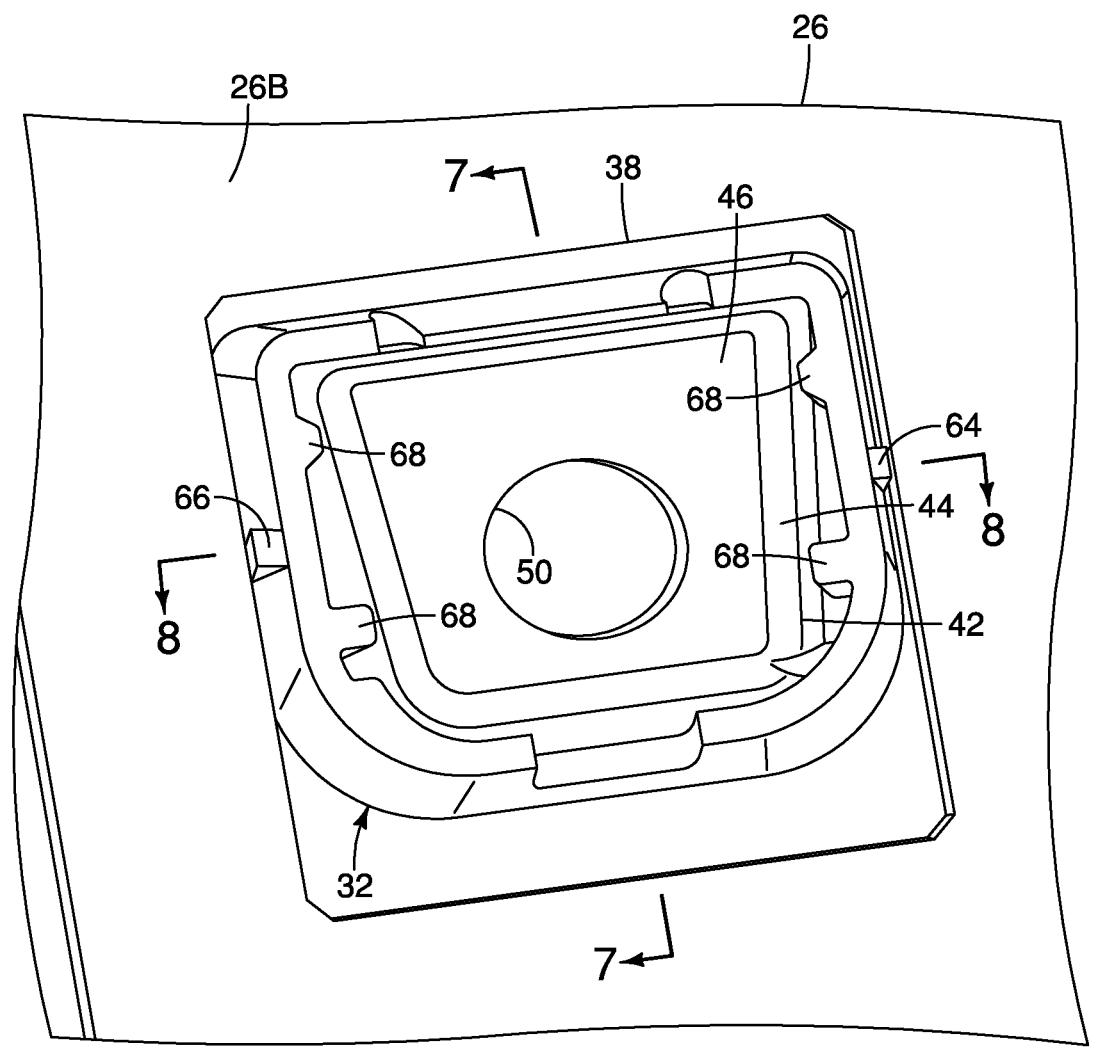
FIG. 6 is an enlarged outboard perspective view of the sash cover assembly connected to the sash of FIG. 2.

The spacer cap 32 is shown connected to the projection 42 of the sash cover 30, in FIGS. 6-8. The spacer cap 32 is positioned such that the first end 56A of the wall 56 faces the inboard surface 30B of the sash cover 30, as shown in FIG. 3. The first and second flexible arms 60 and 62 are aligned with the openings 52 and 54 (FIG. 7) of the projection 42. The spacer 32 is connected to the projection 42 by pushing the spacer cap 32 over the projection 42. The first and second flexible arms 60 and 62 flex outwardly to allow the spacer cap 32 to move over the outer surface of the projection 42. The first and second flexible arms 60 and 62 then flex inwardly to engage the openings 52 and 54, respectively, of the projection 42. The first and second engaging surfaces 60A and 62A of the first and second flexible arms 60 and 62 engage the openings 52 and 54, as shown in FIG. 7, to prevent accidental removal of the spacer cap 32 from the projection 42 of the sash cover 30. The plurality of ribs 68 engage the outer surface of the projection 42, as shown in FIGS. 6 and 8, to further secure the spacer cap 32 to the projection 42. The spacer cap 32 completely surrounds the projection 42 in the installed position, as shown in FIGS. 2 and 6.

As shown in FIGS. 2, 7 and 8, the projection 42 extends beyond the spacer cap 32 in a direction perpendicular to the inboard surface 30B of the sash cover 30. As shown in FIG. 7, a first height D1 of the upper wall 46 of the projection 42 from the inboard surface 30B of the sash cover 30 is larger than a second height D2 of the upper end 56B of the wall 56 of the projection 32.

The sash cover assembly 18 is then connected to the sash panel 26 of the sash 20, as shown in FIGS. 2 and 6-8. The sash cover assembly 18 is positioned such that the inboard surface 30B of the sash cover 30 faces the outboard surface 26A of the sash panel 26 of the sash 20. The spacer caps 32 are inserted through the openings 36 and 38 in the sash panel 26. The ramped surfaces 64 and 66 of the spacer cap 32 engage the perimeter of the openings 36 and 38, thereby creating a press fit connection between the spacer cap 32 and the sash panel 26 of the sash 20 to securely retain the sash cover assembly 18 to the sash 20. The spacer cap 32 is disposed between the sash panel 26 of the sash 20 and the projection 42 in a direction substantially perpendicular to a longitudinal axis A of the projection 42.

In conventional sash covers, the material of the projection and the clear coat on the sash panel have substantially similar coefficients of friction such that movement of the sash cover relative to the sash panel generates a noise. The spacer cap 32 in accordance with the exemplary embodiments of the present invention is disposed between the projection 42 and the sash panel 26 of the panel 20 to prevent contact between the projection 42 and the sash panel 26 of the sash 20 when the sash cover 30 is connected to the sash 20. The projection 42 and the spacer cap 32 are made of different materials, such that the coefficients of friction of the spacer cap 32 and the sash 20 are different, thereby substantially eliminating the generation of a noise resulting from movement of the sash cover 30 relative to the sash 20.

The second and third sash cover assemblies 22 and 25 are configured and installed to the second sash 24 similarly to the first sash cover assembly 18. As shown in FIG. 1, each of the second and third sash cover assemblies 22 and 25 includes two projections 70 that are configured similarly to the projections 40 and 42 of the first sash assembly 18 and that receive spacer caps 32 to facilitate securing the second and third sash cover assemblies to the second sash 24.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the sash cover assembly. Accordingly, these terms, as utilized to describe the present invention should be interpreted relative to a vehicle equipped with the sash cover assembly.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A sash cover assembly for a vehicle comprising:
   a sash cover including a projection configured to be received by a sash of the vehicle; and
   a spacer cap connected to and surrounding the projection, the spacer cap being configured to prevent contact between the projection and the sash when the sash cover is connected to the sash.

2. The sash cover assembly according to claim 1, wherein the projection and the spacer cap are made of different materials.

3. The sash cover assembly according to claim 2, wherein the spacer cap is made of a rubber material.

4. The sash cover assembly according to claim 2, wherein the projection is made of a plastic material.

5. The sash cover assembly according to claim 1, wherein first and second flexible arms extend inwardly from an inner surface of the spacer cap.

6. The sash cover assembly according to claim 5, wherein the first and second flexible arms of the spacer cap are oppositely disposed.

7. The sash cover assembly according to claim 6, wherein the first and second flexible arms engage oppositely disposed openings in the projection.

8. The sash cover assembly according to claim 6, wherein first and second ramped surfaces are disposed on an outer surface of the spacer cap, the ramped surfaces being configured to engage the sash of the vehicle.

9. The sash cover assembly according to claim 1, wherein the projection extends beyond the spacer cap in a direction perpendicular to the sash cover.

10. The sash cover assembly according to claim 1, wherein the spacer cap completely surrounds the projection.

11. A sash assembly for a vehicle comprising:
    a sash;
    an opening disposed in the sash;
    a sash cover assembly connected to the sash, the sash cover assembly including
    a sash cover connected to the sash;
    a projection connected to the sash cover, the projection being received by the opening in the sash; and
    a spacer cap connected to and surrounding the projection, the cap being received by the opening in the sash, the spacer cap being disposed between the sash opening and the projection to prevent contact between the sash and the projection.

12. The sash assembly according to claim 11, wherein the projection extends beyond the spacer cap in a direction perpendicular to the sash.

13. The sash assembly according to claim 11, wherein
the sash cover and the projection are integrally formed as
a one-piece member.

14. The sash assembly according to claim 13, wherein
the sash, the sash cover, and the spacer cap are made of
different materials.

15. The sash assembly according to claim 14, wherein
the spacer cap is made of a rubber material.

16. The sash cover assembly according to claim 15, wherein
the projection is made of a plastic material.

17. The sash cover assembly according to claim 16, wherein
the sash is made of a metallic material.

18. The sash cover assembly according to claim 11, wherein
first and second flexible arms extend inwardly on an inner surface of the spacer cap, the first and second flexible arms engaging corresponding openings in the projection to secure the spacer cap to the sash cover.

19. The sash assembly according to claim 11, wherein
first and second ramped surfaces are oppositely disposed on an outer surface of the cap and engage the sash opening, the spacer cap being press fit to the sash.

20. The sash assembly according to claim 11, wherein
the spacer cap is disposed between the sash and the projection in a direction substantially perpendicular to a longitudinal axis of the projection.

* * * * *